Nov. 10, 1959 E. SAWADE 2,911,858
DRILL PRESS TURRET DEVICE
Filed June 23, 1958 3 Sheets-Sheet 1
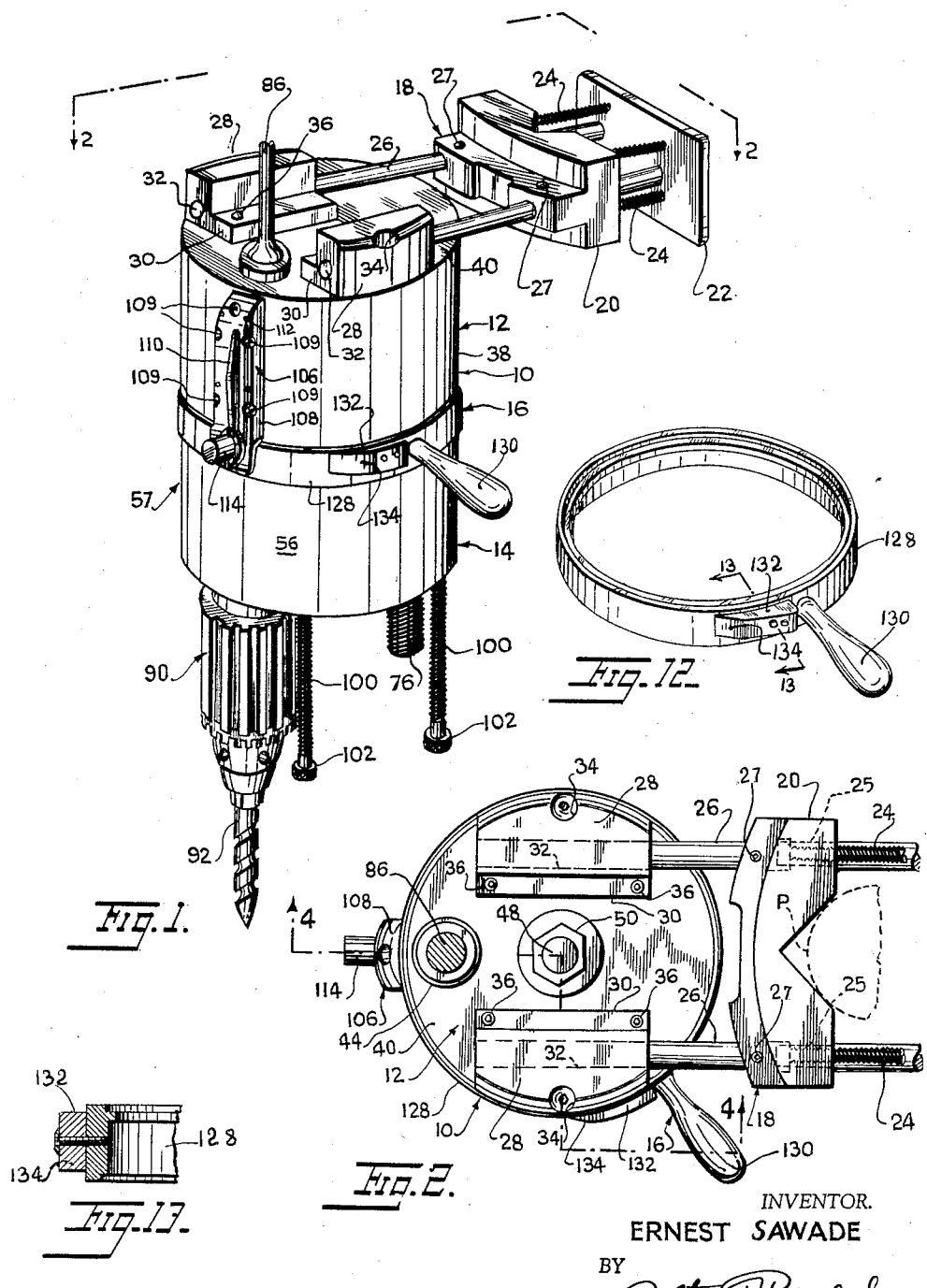
INVENTOR.
ERNEST SAWADE
BY
ATTORNEY Nov. 10, 1959     E. SAWADE     2,911,858

DRILL PRESS TURRET DEVICE

Filed June 23, 1958     3 Sheets-Sheet 2

INVENTOR.
ERNEST SAWADE
BY
*ATTORNEY*

Nov. 10, 1959　　　　　　　E. SAWADE　　　　　　　2,911,858
DRILL PRESS TURRET DEVICE
Filed June 23, 1958　　　　　　　　　　　　　　　3 Sheets-Sheet 3
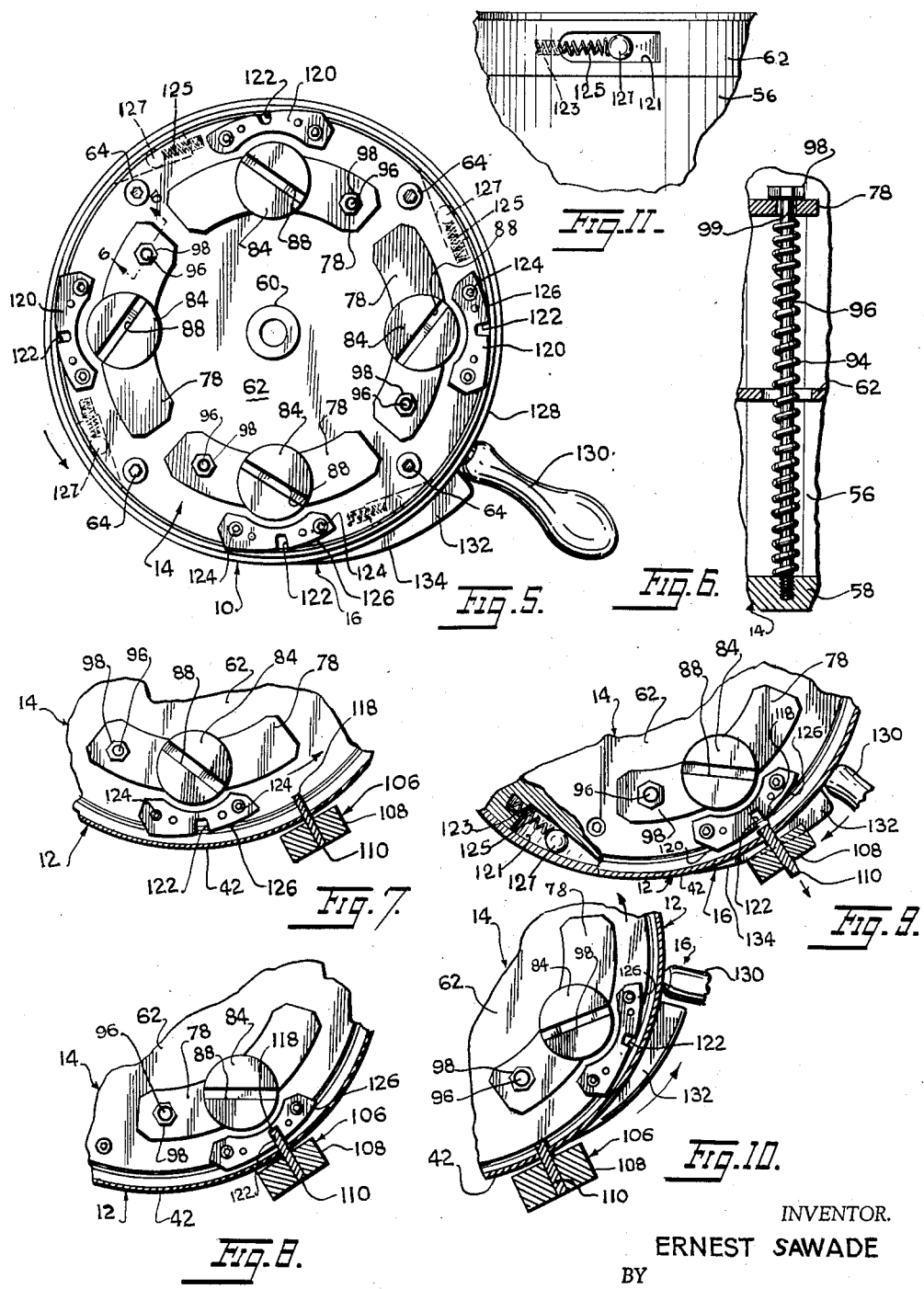
INVENTOR.
ERNEST SAWADE
BY
ATTORNEY

United States Patent Office 2,911,858
Patented Nov. 10, 1959

2,911,858

DRILL PRESS TURRET DEVICE

Ernest Sawade, Brooklyn, N.Y.

Application June 23, 1958, Serial No. 743,943

7 Claims. (Cl. 77—25)

This invention relates to drill press attachments, and more particularly has reference to a drill press turret so designed as to increase measurably the versatility of an otherwise conventional drill press, by permitting rapid selection from among a multiplicity of drill bits or related tools.

One important object of the present invention is to provide a drill press turret in the nature of an attachment to an otherwise conventional drill press, which turret can be associated with the drill press without requiring any modification or redesign of said press.

A further object is to form the drill press turret so as to permit it to be swiftly attached to or detached from the associated drill press.

Yet another object is to permit the rapid adjustment of the position of the turret, so that it will be swiftly accommodated to drill presses differing from one another in respect to their make, size, and type. In this way, it is proposed to permit a single drill press turret formed according to the present invention to be used with any of a plurality of different drill presses.

A further object is to include novel means in the drill press turret which will permit its swift adjustment to any of a plurality of positions, in each of which a different tool bit or similar tool will be aligned with the driving shank of the drill press.

Still another object is to cause said shank to be automatically drivingly engaged with the selected tool bit responsive merely to downward feeding of the shank in the conventional manner.

A further object of importance is to provide a drill press turret so formed that each of the multiplicity of tool bits can be adjusted independently of the remaining bits with respect to the depth of penetration into the work.

A further object is to provide a drill press turret as described above that will have novel, automatically operating latch means that will cause each tool bit to remain in aligned position with the drill press shank, responsive merely to adjustment of the device to a position in which said alignment occurs.

A further object is to provide novel means for swiftly releasing the latch device, whenever the turret is to be readjusted to another position.

Yet another object of importance is to provide a drill press turret of the character described that will, when mounted upon a drill press post or standard, be swiftly movable into and out of operative position, so as to permit the drill press to be operated either with or without the turret, as desired.

Another object of importance is to provide a drill press turret according to the present invention that will be capable of manufacture at a comparatively low cost considering the benefits to be obtained from the use thereof, and that will be substantially trouble-free in operation, comparatively simply designed, and capable of long use with a minimum of maintenance or repair.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a drill press turret according to the present invention.

Fig. 2 is a top plan view thereof as seen from the line 2—2 of Fig. 1, parts being broken away, and a fragment of a supporting post being shown in dash lines.

Fig. 5 is a top plan view of the rotatable lower section of the device as seen from the line 5—5 of Fig. 4, with the upper section being completely removed.

Fig. 6 is an enlarged, detail sectional view of a combined spring and guide assembly, taken substantially on line 6—6 of Fig. 5.

Figs. 7, 8, 9 and 10 are fragmentary plan sectional views showing the relatively movable lower section, latch release means, and latch means in successively following positions to which they are moved during engagement and disengagement of the same.

Fig. 11 is a fragmentary detail elevational view of the top of the lower section of the turret showing the mechanism for preventing rotation of the latch releasing ring.

Fig. 12 is a perspective detail view showing the cam carrying latch releasing ring.

Fig. 13 is a sectional view taken on the plane of the line 13—13 of Fig. 12.

Figure 3:
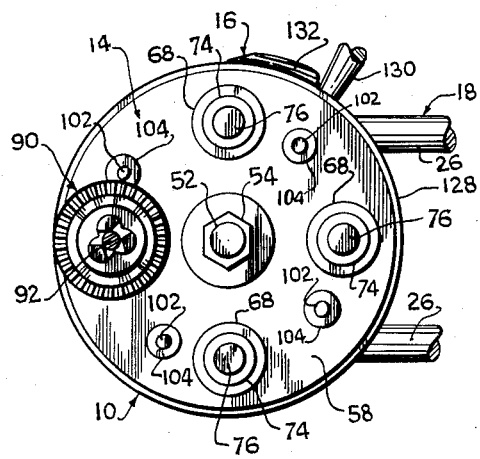
Fig. 3 is a bottom plan view of the turret.

Referring to the drawings in detail, designated generally at 10 is the drill press turret constituting the present invention. This may appropriately be considered as comprising a stationary upper section generally designated 12, a rotatable lower section generally designated 14, a latch release assembly generally designated 16, and an overhead support assembly generally designated 18.

The overhead supply assembly (see Fig. 2) is adapted to be secured to an upstanding support post or standard P comprising the post or ram of the drill press. The assembly 18 projects laterally from the post, and fixedly secured to and depending from the laterally projecting portion of assembly 18 is the stationary upper section 12. The lower section 14 cooperates with the upper section in defining a cylindrical structure, as will be readily noted from Fig. 1, and said rotatable lower section is adapted to rotate about a vertical axis, upon the upper section 12, to the lower end of which said lower section 14 is swivelly connected. The whole purpose of the arrangement is to locate the upper section in a position such that the drive shaft of the drill press may extend into an opening provided in the upper section, it being understood that the upper section can be horizontally adjusted upon the assembly 18 to a position where it will receive said shaft, and can also be adjusted laterally out of the way so that the drive shaft of the drill press can be used without the turret if desired.

In any event, the lower section carries angularly spaced chucks, each of which may carry a different size drill bit or other tool, and by rotation of the lower section to selected positions relative to the upper section, selected chucks can be brought into alignment with the drive shaft of the drill press, in an arrangement such that extension of the drive shaft into the opening provided in the upper section will automatically drivingly engage the same with the selected chuck. The arrangement, further, is designed to cause the selected chuck to be maintained in coaxial alignment with the driving shaft, by an automatic latching action that occurs on each angular adjustment of the lower section relative to the upper section. Further, a latch release means is designed to swiftly disengage or release the latch, whenever another rotatable adjustment of the lower section is desired.

With the above general discussion of the relative arrangement and operational characteristics of the various components being kept in mind, it is appropriate now to consider the particular construction of each of these components.

Considering first the overhead support assembly 18, this includes a pair of opposed clamp members, comprising a clamping block 20 and a clamping plate 22. These are adapted to be disposed at opposite sides of the post P, the block 20 having a notch receiving the post as shown in Fig. 2. At opposite sides of the post P, screws 24 are swivelly engaged in smooth-walled bores 25 of the block 20. The screws extend through the openings of the clamp plate and block, and bolts are applied to the screws so that the block and plate can be adjusted toward each other into clamping engagement with the post. The device, as will be understood, can be adjusted vertically along the post to selected positions, and can also be swung about the post before the clamping action is effected, thus to locate the device wherever desired with respect to the post P.

Smooth-walled guide bores are provided in the block and the plate 22, and slidable in said bores are horizontally extending support bars 26. The support bars 26, if desired, may be locked in place in a particular commercial embodiment of the invention, through the use of setscrews 27 threadedly engaged in the block 20. It will be understood that this is only one suggested construction, and if desired, the bars 26 might be more or less permanently fixedly engaged in the block, with the cylindrical structure defined by the upper and lower sections 12, 14 being freely slidable upon the bars.

In any event, the bars 26, at the ends thereof remote from the post P, extend into confronting, identical, but oppositely formed support blocks 28 formed along their inner longitudinal surfaces with confronting flanges 30. Blocks 28 have arcuately, outwardly bowed outer longitudinal surfaces, coinciding with the circumference of the upper section 12 in a typical embodiment of the invention.

Bores 32 are formed in the blocks 28, receiving the bars 26. The bars 26 might be freely slidable in the bores 32, or alternatively, could be fixedly engaged therein, by setscrews, not shown, or by any other suitable means.

Blocks 28 are fixedly secured to the top wall of the upper section 12, through the provision of screws extending through countersunk openings 34 of the blocks proper, and through openings 36 of the flanges 30. Openings 34, 36 would be smooth-walled, with the top wall of the upper section having threaded openings receiving the connecting screws.

The upper section 12 will now be described. This includes a shell 38 of an inverted, cylindrical, cup-shape, having a flat top wall 40 and formed open at its bottom. The shell is of thick-walled construction, and referring to Fig. 4, an internal continuous circumferential groove 42 of right angled cross section is formed in the side wall of the shell, at the lower edge thereof.

In the top wall 40, adjacent the periphery thereof, there is a large opening in which is fixedly engaged a bushing 44.

A connector bar 46 is extended axially of the shell, having a large diameter intermediate portion 47 integral at its upper end with a threaded, reduced axial extension 48 extending through a smooth-walled center opening 49 of top wall 40. A nut 50 is threaded on extension 48, and a washer 51 is preferably interposed between the nut 50 and the top wall 40.

Intermediate portion 47 is integral with an elongated lower end portion 52 of smooth-surfaced formation for the greatest part of its length, the lower portion 52 being substantially smaller in diameter than the intermediate portion 47. At its lower end, portion 52 has threads 53 to which a nut 54 is applied, with a washer 55 being interposed between the nut and the lower end of the lower section 14 of the device. It will be understood that a jam or lock nut, not shown, could also be threaded upon the extension 53 to prevent the nut 54 from turning off the extension 53.

Figure 4:
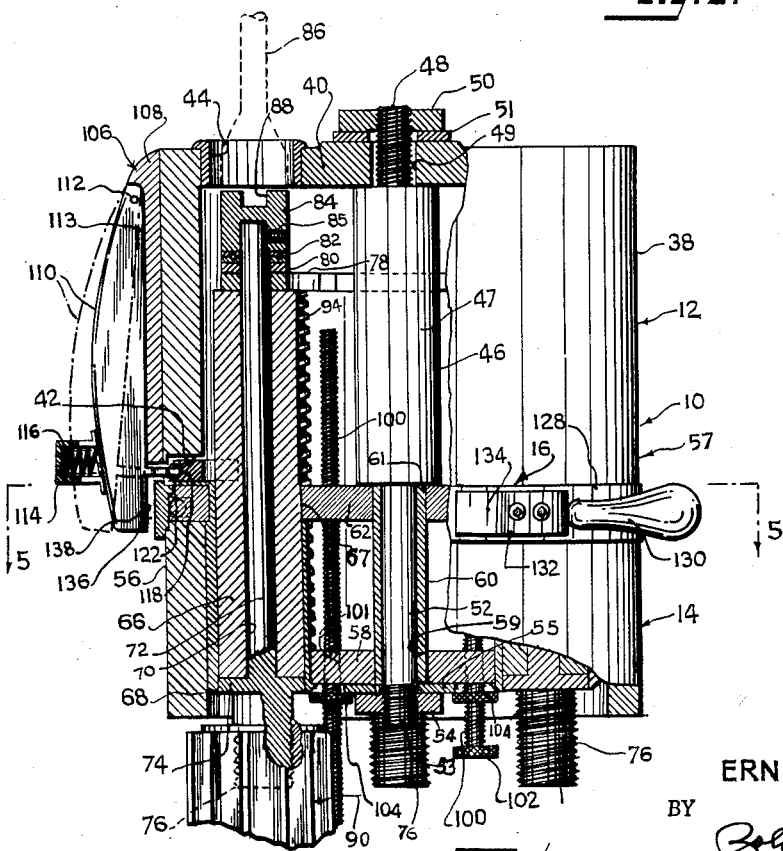
Fig. 4 is an enlarged view of the device, portions being broken away, substantially on line 4—4 of Fig. 2, the overhead support means of the device not being shown, a latch being shown in full and dotted lines in its engaged and released positions, respectively.

The lower section 14 includes a shell 56 which is of cylindrical, cup shape, opening in the direction of the upper shell, so that the two shells, when in abutting relation as in Fig. 4, cooperate in defining a hollow, cylindrical housing generally designated at 57 in Fig. 4 and in Fig. 1. A horizontal thick bottom wall 58 of shell 56 is disposed inwardly of the bottom edge of shell 56 and has a center opening 59 in which is engaged the lower end of an elongated bushing or sleeve 60, in which rotates the lower end portion of the connector bar 46. Bushing 60 at its upper end is engaged in a center opening 61 of a flat partition plate 62, interposed between the upper and lower shells so as to extend as a partition across the housing 57 intermediate the upper and lower ends thereof. Plate 62 is of the same thickness as bottom plate 58.

It will be seen that assuming that nut 54 is not turned tightly against the lower end of the section 14, the section 14 will be rotatably supported in position against the lower end of the stationary upper section 12, with said lower section rotating bodily about the stationary lower end portion 52 of connector bar 46.

Fixedly connecting the partition plate 62 to the shell 56 for rotation therewith is a series of screws 64 (see Fig. 5) extending through smooth-walled openings of the plate 62 at locations uniformly, angularly spaced about the margin of the plate 62, said screws being threadedly engaged at their lower ends in the bottom wall 58 of shell 56.

The lower section also includes a plurality of rotatably disposed, elongated bearing sleeves 66, projecting through openings 67 in plate 62 a substantial distance upwardly of the plate 62 into the upper shell 38. Sleeves 66 have their lower end portions rotatably engaged in bushings or liners 68 that are extended between and are fixedly engaged at their ends in the plate 62 and bottom wall 58, respectively. In the illustrated embodiment, there are four bearing sleeves 66, arranged in an annular series and angularly spaced 90° apart in the lower section, each sleeve 66 being adapted to be carried, responsive to rotatable adjustment of the lower section, into coaxial alignment with the liner or bushing 44 of the upper section.

Sleeve 66 has an end-to-end, constant diameter, the axial bore 70 in which rotatably receives an elongated shank 72, the lower end of which has a collar 74 abutting the lower end of sleeve 66. Shank 72 includes a threaded axial extension 76 integrally formed with and extending downwardly from collar 74.

The several extensions 76 extend below bottom wall 58, for a purpose to be made presently apparent.

Supported upon the upper extremities of sleeves 66 are arcuate, flat abutment plates 78 (see Fig. 5). The several plates 78 are curved about a center that coincides with the axis of rotation of the shell 56. Abutment plates 78, intermediate their ends, have openings receiving the shanks 72.

Referring to Fig. 4, supported upon each plate 78 is a washer 80, above which is a ball bearing 82, interposed between washer 80 and a cylindrical driving head 84 fixedly connected to shank 72, as for example by a setscrew 85 threaded in the head 84 and bearing against a flat surface of the shank. Any other suitable means can of course be employed for fixedly connecting the head 84 to the shank 72.

It will thus be seen that shank 72 is freely rotatable, together with its drive head 84, within the shell 56 of the lower section, and to effect rotation of a selected shank 72, there is the conventional driving shaft or shank 86 of the drill press. Shaft 86 has at its lower end a head formed with a diametrically extending, depending lip or tongue that is adapted to extend into an upwardly opening, diametrically disposed groove 88 of drive head 84.

From the description so far provided, accordingly, it will be observed that lower section 14 can be rotated bodily on upper section 12. In each position to which it is rotated, a sleeve 66 is aligned with bushing 44, that is, a selected shank 72 can be brought into alignment with the driving shaft 86 of the drill press. The shaft 86 is now moved downwardly, and the tongue thereof will engage in groove 88. Rotation of shaft 86 will now cause rotation of shank 72 and hence of axial extension 76 of the shank 72.

Secured to each extension 76 is a conventional chuck 90, as for example, a Jacobs chuck, and engageable in each chuck is a selected tool, such as a drill bit 92 (Fig. 1). In the illustrated example, only one chuck is shown, but in a working arrangement, there would be a chuck on each extension 76, with each chuck being adapted to receive a selected drill bit.

Each sleeve 66, together with its shank 72, is movable in an axial direction, during rotation of the shank 72 therein. In other words, in a drill press the shaft 86 of the press not only is rotated, but is being moved downwardly in a vertical path to feed the drill bit 92 into the work. The shank 72, drivingly engaged with the bit, moves downwardly, together with its sleeve 66, abutment plate 78, and driving head 84.

Resilient, yielding means is interposed between plate 78 and bottom wall 58, opposing the downward movement of the sleeve 66. Referring to Fig. 6, this means for each sleeve 66 comprises an elongated rod 96 having at its upper end a head 98 bearing against the top surface of abutment plate 78 at one side of sleeve 66. The rod is loosely received in an opening 99 of plate 78 so that plate 78 can slide downwardly on the rod, the lower end of the rod being threadedly engaged in or otherwise fixedly attached to the bottom wall 58 of shell 56. A compression, coil spring 94 circumposed about rod 96 abuts at its opposite ends against plate 78 and bottom wall 58. Head 98, of course, limits the upward movement of the sleeve 66, after the downward feeding has terminated and the shaft 86 has been permitted to move in an upward direction. This retracts the tool 92 from the work, as will be understood.

Means is provided to limit the downward feeding beyond a predetermined point, that is, the device includes a depth adjustment means for each sleeve 66. The depth adjustment means, which limits the downward feeding of the bit 92 beyond a predetermined, selected depth within the work, has been shown to particular advantage in Figs. 1 and 4. It comprises, adjacent each sleeve 66, an elongated, vertical screw 100, the upper end of which terminates in spaced relation to the bottom surface of the abutment plate 78, at the side of the plate opposite that at which the rod 96 is disposed.

Each screw 100, at its lower end, is threadedly engaged in an opening 101 of the bottom wall 58. Each screw 100 at its lower end has a knurled head 102 to facilitate manual rotation of the same, and a knurled lock nut 104 is threaded on the screw and is adapted to bear against the bottom wall 58 to lock the same in any selected position of axial adjustment of the screw.

It will be observed that this arrangement permits a stop to be located at a selected point below each abutment plate 78 to limit the downward movement of the sleeve 66 beyond a predetermined extent.

Referring to Fig. 4, the device includes a latching assembly generally designated 106, provided upon the upper section 12. The latch assembly 106 is provided with an elongated, vertically extending latch support block 108 (see Figs. 1 and 4), said block being secured by screws 109 to the side wall of the shell 38.

A longitudinally and centrally extending, outwardly opening slot of block 108 receives a pivoted, flat latching arm 110 (see Fig. 4) swingable between the full and dotted line positions shown in Fig. 4, upon a transversely disposed pivot pin 112 carried by block 108 and extending across the upper end of the slot 113 of block 108.

Straddling the slot 113 at the lower end thereof is a retaining cup 114 for a compression, coil spring 116 bearing against the distal end portion of the latch arm to normally bias the arm toward the full line position thereof shown in Fig. 4. At the lower end of the arm, there is an inwardly projecting finger 118.

In close proximity to each sleeve 66 is a latch block 120 of elongated formation, provided intermediate its ends with a laterally, outwardly opening notch 122 adapted to receive finger 118 in the latching, full line position of the arm 110 shown in Fig. 4. Each block 120 is fixedly secured by screws 124 to the upper surface of plate 62, with the screws passing through openings provided in the partitioning plate 62, the blocks being adjacent the upper edge of the side wall of shell 56.

The outer longitudinal edge surface of each block 120 is curved from end to end thereof, about an arc eccentric to the center about which the lower section turns. The outer surface 126 constitutes a cam surface, in the intermediate portion of which the notch 122 is formed, said cam surface moving progressively to the outer periphery of the lower section in the sense of a direction taken circumferentially of the lower section, with the leading end of the block 120, considered in the sense of the direction in which the lower section turns shown by the arrow in Fig. 5, being further away from the periphery of the lower section.

By reason of this arrangement, a cam surface is provided which will engage the finger 118 on arm 110 and bias the same outwardly until the finger moves into registration with the notch 122, after which the finger will engage in the notch to lock the lower section against further rotatable movement in the direction of the arrow shown in Fig. 5.

It is appropriate now to consider the latch release assembly generally designated at 16. This comprises a ring 128 rotatably supported upon the lower section 14, that is, the ring can rotate relative to the section. Secured to and projecting radially outwardly from the ring is a handle 130, adjacent a cam block 132 fixedly secured to the ring and having a cam surface 134 that is gradually progressively increased in respect to its distance from the periphery of the lower shell, in the direction in which the lower shell rotates.

In use, the drill press turret is supported from the post P, by means of the overhead assembly 18, and the cylindrical housing 57 is adjusted upon the bars 26 until the shaft 86 of the drill press is coaxially aligned with the bushing 44, so that it can move into and out of the bushing.

By reason of this arrangement, one can select any of a plurality of angularly spaced chucks 90 carrying drill bits 92, to be driven by the shaft 86 and fed downwardly with the shaft into the work.

It will be assumed now that a particular chuck 90 is to be lined up with the shaft 86, so as to be drivingly connected thereto when the shaft is fed downwardly through the bushing 44. Accordingly, the lower section 14 is bodily rotated in respect to the upper section 12, until the selected chuck is lined up with the shaft 86.

Referring to Fig. 7, the selected driving head 84, that is provided for the selected chuck, is shown approaching its proper position in Fig. 7.

In Fig. 8, the appropriate driving head is shown as it arrives at its proper position, this being the position shown in Fig. 4, that is, a position in which the head 84 is aligned with the shaft 86 in position to receive the tongue of the shaft 86 in its groove 88.

It will be noted that as the head 84 approaches its proper position, the low end of the cam surface 126 will engage the finger 118, and that the finger 118 will be cammingly biased outwardly by the surface 126 until it registers with the notch 122. Under the pressure of the spring 116, finger 118 will enter the notch 122 at this time, as shown in Fig. 8.

Thus, the lower section 14 locks automatically in each selected position of rotatable adjustment thereof.

The shaft 86 is now fed downwardly, engaging in groove 88, and is driven rotatably, so as to also rotate the shank 72, and hence the chuck 90 and drill bit 92. Shaft 86, meanwhile, is being moved downwardly to advance the bit through the work with spring 94 compressing as necessary to yieldably oppose the downward feeding. Eventually, the abutment plate 78 engages the upper end of the stop screw 100, limiting the feeding of the bit through the work beyond a selected, adjusted depth.

The shaft 86 is now raised, and spring 94 expands so that the bit is retracted from the work.

Assuming that it is now desired to select another bit, one releases the section 14 for further rotatable movement by grasping handle 130 and moving the handle in a clockwise direction, viewing the device as in Fig. 9. The handle thus moves in the direction of the arrow shown adjacent the same in Fig. 9, with the low end of the cam surface 134 leading in the sense of the direction in which the handle is being moved.

The cam block 132 enters initially into a narrow space 136 shown in Fig. 4, said space being defined between the ring 128 and the lower end portion of the inner longitudinal edge of latch arm 110.

In other words, the leading end of the cam block engages the inner longitudinal edge 138 of arm 110, below finger 118. Further movement of the ring 128 in a clockwise direction viewing the same as in Fig. 9 will cause the block 132 to bias the arm 110 radially outwardly of the structure to move finger 118 out of the notch 122. Eventually, further movement of the block in its camming direction is prevented, since the block becomes too thick toward its trailing end to pass between the arm 110 and ring 128.

Now, the lower shell 56 can be rotated once again in a counterclockwise direction viewing the same as in Figs. 7–10, as shown in Fig. 10. This is so arranged that as the shell of the lower section turns counterclockwise, moving past the now retracted latch arm 110, it takes with it the cam ring, that is, both the cam ring 128 and the shell 56 are now rotating conjointly.

This is by reason of the fact that although ring 128 can rotate relative to shell 56 in a clockwise direction viewing the same as in Fig. 9, it cannot have retrograde rotatable movement relative to the shell, and can only move in a retrograde direction from its Fig. 9 to its Fig. 10 position if the shell is moved. This may be arranged by having a suitable friction engaging mechanism between the ring and shell, such that the ring can rotate in one direction relative to the shell, but cannot rotate in the opposite direction relative to said shell 56.

Such friction-engaging mechanism is shown in Fig. 11 and includes a series of equidistantly spaced elongated recesses 121 formed in the periphery of the partition plate 62, each recess tapering and being progressively deeper in a direction counter to the direction of rotation of the lower section 14 as indicated by the arrow in Fig. 5. A countersunk seat 123 is formed in the deeper base portion of each recess for receiving one end of a compressed coil spring 125. The other end of the spring 125 seats and impinges against a ball detent 127 as shown in Fig. 11. The diameter of the ball detent 127 is such that it projects outwardly of the groove into pressing contact with the inner surface of ring 128 whereby the ring 128 may move in a clockwise direction but is prevented from moving in a counterclockwise direction as viewed in Fig. 9.

It will be seen that in this way, another chuck can be properly positioned, and the lower section will latch automatically when the next chuck is in proper position.

As will be understood, the device has certain very desirable characteristics, in that it permits any one of a multiplicity of chucks to be swiftly moved into driving relationship to a single driving shaft 86 of a drill press. Further, each selected chuck can be fed downwardly with the drill press without interfering with or being interfered with by other chucks. Still further, each chuck may have its own individual depth adjustment.

The automatic latching means and the latch release means generally designated at 106, 16, respectively, are also important features of the invention, and permit swift automatic latching, and equally swift unlatching.

Still further, the entire device can be swiftly moved out of position, if it is desired to use the drill press without the turret.

Yet another important feature of the invention resides in the fact that there is no modification or redesign of any kind of the drill press itself and the device can be used with any of various makes and types of drill presses within, of course, a prescribed range. The device can be mounted upon any round column drill press and drum type structure of this nature.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A drill press turret comprising an overhead support assembly adapted for connection to a stationary portion of a drill press, a housing including a stationary upper section depending from said overhead support assembly and a lower section depending from and rotatable on the upper section, the upper section being adapted to receive a vertically movable and rotatable driving shaft of a drill press, said lower section including a plurality of shanks mounted in the lower section in angularly spaced relation for rotation and for vertical movement, said shanks being selectively alignable with said drive shaft on rotation of the lower section to correspondingly selected positions, said shanks being adapted for being drivingly engaged with the shaft, and chucks carried by the several shanks and adapted to receive tool bits, said turret further including cooperating latch means on the upper and lower sections adapted for latching the lower section against rotation relative to the upper section in each position to which the lower section is rotatably adjusted, said latch means including a latch arm carried by the upper section, and a plurality of latching blocks on the lower section corresponding in number and location to the several shanks and individually engageable with the latch arm.

2. A drill press turret comprising an overhead support assembly adapted for connection to a stationary portion of a drill press, a housing including a stationary upper section depending from said overhead support assembly and a lower section depending from and rotatable on the upper section, the upper section being adapted to receive a vertically movable and rotatable driving shaft of a drill press, said lower section including a plurality of shanks mounted in the lower section in angularly spaced relation for rotation and for vertical movement, said shanks being selectively alignable with said drive shaft on rotation of the lower section to correspondingly selected positions, said shanks being adapted for being drivingly engaged with the shaft, and chucks carried by the several shanks and adapted to receive tool bits, said turret further including cooperating latch means on the upper and lower sections adapted for latching the lower section against rotation relative to the upper section in each position to which the lower section is rotatably adjusted, said latch means including a latch arm carried by the upper section, and a plurality of latching blocks on the lower section corresponding in number and location to the several shanks and individually engageable with the latch arm, said blocks having cam surfaces adapted for cammingly engaging the latch arm to temporarily bias the latch arm outwardly from the upper section during movement of a selected block into latching engagement with the arm.

3. A drill press turret comprising an overhead support assembly adapted for connection to a stationary portion of a drill press, a housing including a stationary upper section depending from said overhead support assembly and a lower section depending from and rotatable on the upper section, the upper section being adapted to receive a vertically movable and rotatable driving shaft of a drill press, said lower section including a plurality of shanks mounted in the lower section in angularly spaced relation for rotation and for vertical movement, said shanks being selectively alignable with said drive shaft on rotation of the lower section to correspondingly selected positions, said shanks being adapted for being drivingly engaged with the shaft, and chucks carried by the several shanks and adapted to receive tool bits, said turret further including cooperating latch means on the upper and lower sections adapted for latching the lower section against rotation relative to the upper section in each position to which the lower section is rotatably adjusted, said latch means including a latch arm carried by the upper section, and a plurality of latching blocks on the lower section corresponding in number and location to the several shanks and individually engageable with the latch arm, said blocks having cam surfaces adapted for cammingly engaging the latch arm to temporarily bias the latch arm outwardly from the upper section during movement of a selected block into latching engagement with the arm, said turret additionally including a latch release means on the housing for disengaging the latch arm from a selected block with which it is latchingly engaged.

4. A drill press turret comprising an overhead support assembly adapted for connection to a stationary portion of a drill press, a housing including a stationary upper section depending from said overhead support assembly and a lower section depending from and rotatable on the upper section, the upper section being adapted to receive a vertically movable and rotatable driving shaft of a drill press, said lower section including a plurality of shanks mounted in the lower section in angularly spaced relation for rotation and for vertical movement, said shanks being selectively alignable with said drive shaft on rotation of the lower section to correspondingly selected positions, said shanks being adapted for being drivingly engaged with the shaft, and chucks carried by the several shanks and adapted to receive tool bits, said turret further including cooperating latch means on the upper and lower sections adapted for latching the lower section against rotation relative to the upper section in each position to which the lower section is rotatably adjusted, said latch means including a latch arm carried by the upper section, and a plurality of latching blocks on the lower section corresponding in number and location to the several shanks and individually engageable with the latch arm, said blocks having cam surfaces adapted for cammingly engaging the latch arm to temporarily bias the latch arm outwardly from the upper section during movement of a selected block into latching engagement with the arm, said turret additionally including a latch release means on the housing for disengaging the latch arm from a selected block with which it is latchingly engaged, the latch release means comprising a ring rotatably mounted upon the lower section and a cam on the ring adapted to bias the arm out of engagement with a block responsive to rotation of the ring relative to the lower section in one direction.

5. A drill press turret comprising an overhead support assembly adapted for connection to a stationary portion of a drill press, a housing including a stationary upper section depending from said overhead support assembly and a lower section depending from and rotatable on the upper section, the upper section being adapted to receive a vertically movable and rotatable driving shaft of a drill press, said lower section including a plurality of shanks mounted in the lower section in angularly spaced relation for rotation and for vertical movement, said shanks being selectively alignable with said drive shaft on rotation of the lower section to correspondingly selected positions, said shanks being adapted for being drivingly engaged with the shaft, and chucks carried by the several shanks and adapted to receive tool bits, said lower section further including a plurality of sleeves in which said shanks are rotatably mounted, said sleeves being mounted in the lower section for vertical movement with their associated shanks, the lower section including means adjustably limiting the downward movement of the sleeves in a vertical direction, said last-named means comprising screws threadedly engaged in the lower section adjacent the several sleeves, the lower section including abutment plates carried by and projecting laterally from the sleeves, in position to be engaged by the screws on downward vertical movement of the sleeves, said lower section further including resilient, yielding means associated with the several sleeves adapted for biasing the sleeves vertically upwardly following downward movement of the sleeves.

6. A drill press turret comprising an overhead support assembly adapted for connection to a stationary portion of a drill press, a housing including a stationary upper section depending from said overhead support assembly and a lower section depending from and rotatable on the upper section, the upper section being adapted to receive a vertically movable and rotatable driving shaft of a drill press, said lower section including a plurality of shanks mounted in the lower section in angularly spaced relation for rotation and for vertical movement, said shanks being selectively alignable with said drive shaft on rotation of the lower section to correspondingly selected positions, said shanks being adapted for being drivingly engaged with the shaft, and chucks carried by the several shanks and adapted to receive tool bits, said lower section further including a plurality of sleeves in which said shanks are rotatably mounted, said sleeves being mounted in the lower section for vertical movement with their associated shanks, the lower section including means adjustably limiting the downward movement of the sleeves in a vertical direction, said last-named means comprising screws threadedly engaged in the lower section adjacent the several sleeves, the lower section including abutment plates carried by and projecting laterally from the sleeves, in position to be engaged by the screws on downward vertical movement of the sleeves, said lower section further including resilient, yielding means associated with the several sleeves adapted for biasing the sleeves vertically upwardly following downward movement of the sleeves, said last-named means comprising springs in the lower section disposed adjacent the several sleeves in position exerting upward pressure upon the several abutment plates.

7. A drill press turret as defined in claim 4, having means for preventing rotation of the ring in the opposite direction, said means including ball tetents carried by the lower section spring pressed into contact with the inner surface of the ring.

References Cited in the file of this patent

UNITED STATES PATENTS 2,590,283    Weaver _____ Mar. 25, 1952

FOREIGN PATENTS 259,526    Switzerland _____ July 1, 1949